United States Patent [19]

Hayakawa

[11] Patent Number: 5,179,520

[45] Date of Patent: Jan. 12, 1993

[54] METHOD OF AND APPARATUS FOR PREPARING SEWING DATA FOR A MULTI-NEEDLE EMBROIDERY SEWING MACHINE

[75] Inventor: Atsuya Hayakawa, Nagoya, Japan

[73] Assignee: Brother Kogyo Kabushiki Kaisha, Nagoya, Japan

[21] Appl. No.: 523,379

[22] Filed: May 15, 1990

[30] Foreign Application Priority Data

May 30, 1989 [JP] Japan .................................. 1-136562

[51] Int. Cl.$^5$ ............................................ G06F 15/46
[52] U.S. Cl. .................... 364/470; 112/80.23; 112/121.12
[58] Field of Search .............. 364/470; 112/80.23, 112/84, 121.11, 121.12, 103, 456

[56] References Cited

U.S. PATENT DOCUMENTS

| | | | |
|---|---|---|---|
| 4,520,745 | 6/1985 | Shinomoya et al. | 112/103 |
| 4,834,007 | 5/1989 | Miyazaki et al. | 364/470 |
| 4,849,902 | 7/1989 | Yokoe et al. | 364/470 |
| 4,991,524 | 6/1992 | Ozaki | 112/103 |

FOREIGN PATENT DOCUMENTS 2199165  6/1988  United Kingdom .

Primary Examiner—Jerry Smith
Assistant Examiner—Patrick D. Muir
Attorney, Agent, or Firm—Oliff & Berridge

[57] ABSTRACT

In a data preparing method and apparatus for an embroidery sewing machine, when a first memory stores outline data of an embroidery pattern, a reference direction determining device computes a length or a width of the embroidery pattern as a reference direction based on the outline data. Based on the outline data and the reference direction, a first computing device computes outline data of closed areas into which the embroidery pattern is divided by a segment intersecting the reference direction at a predetermined angle. Based on the outline data computed by the first computing device and the direction of the segment, a second computing device computes needle location data or block data that is related with needle location for embroidering the closed areas. The direction in which the segment extends corresponds to a stitch-forming direction. The needle location data or the block data is stored into a second memory device. By providing the closed-area outline data, the data for embroidering the closed areas can automatically be prepared. Therefore, an operator does not have to designate closed areas having a configuration for facilitating the computation of the data. This automatic data preparing unit thus saves time. Even an unexperienced operator can easily prepare the data.

16 Claims, 18 Drawing Sheets

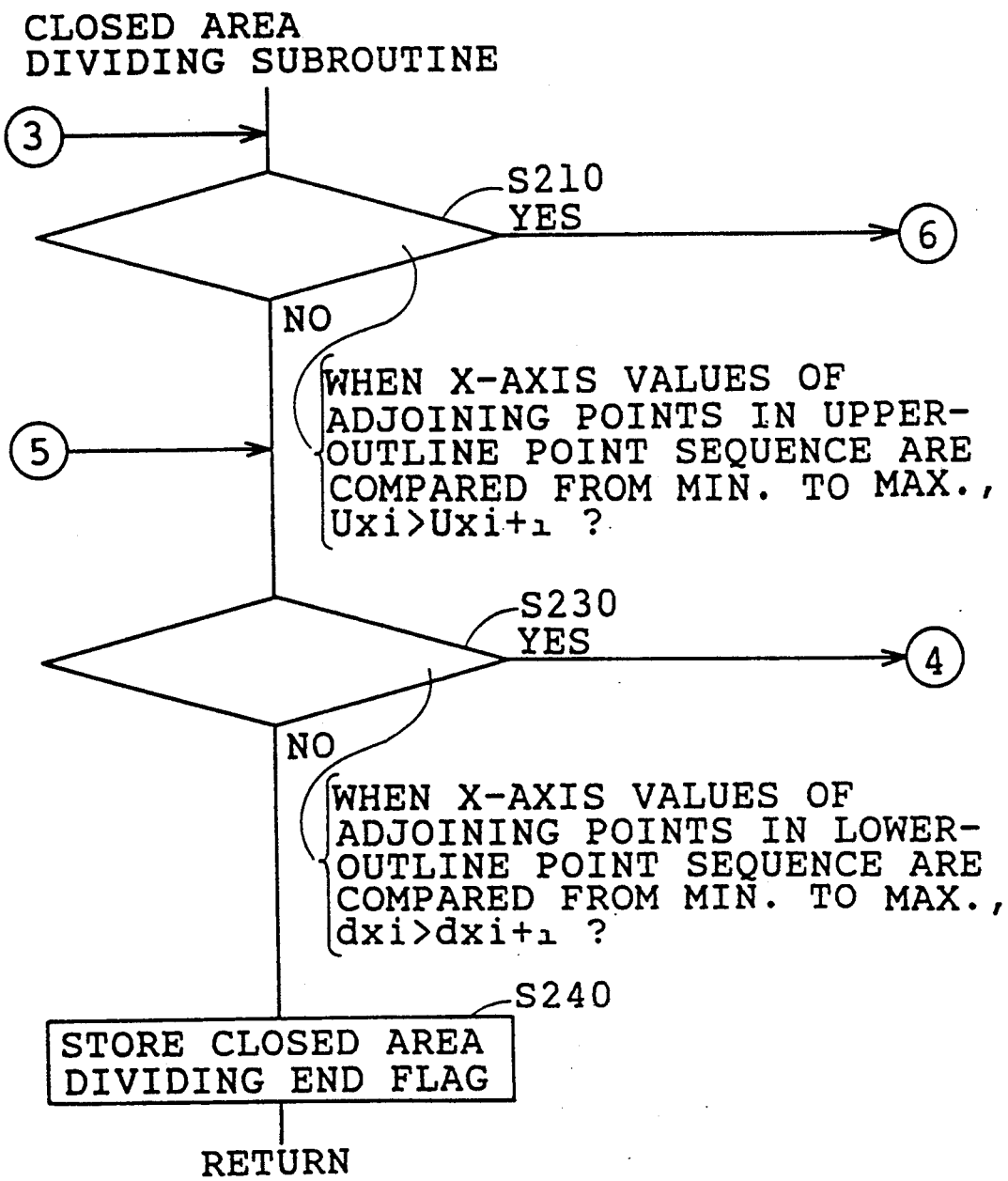

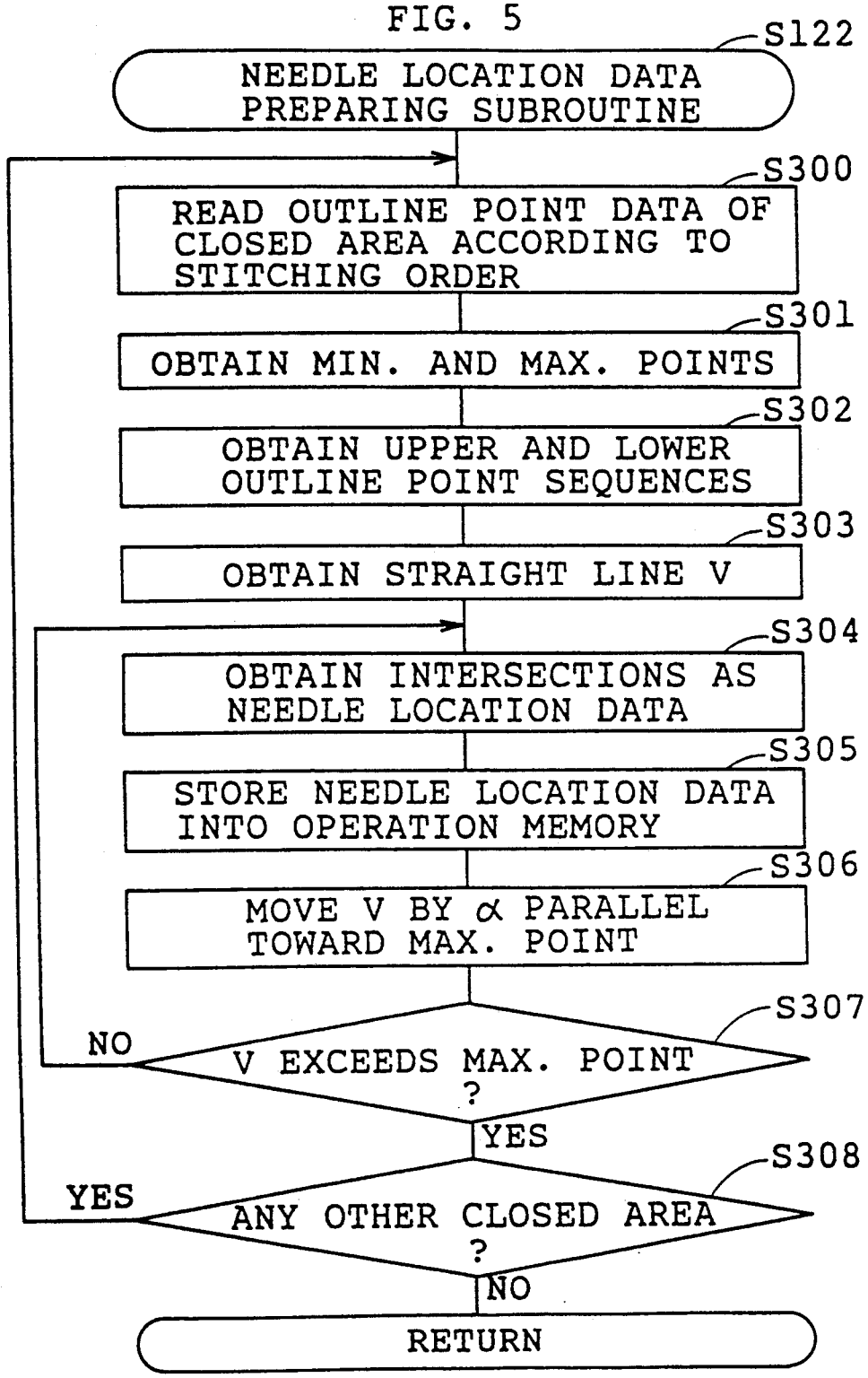

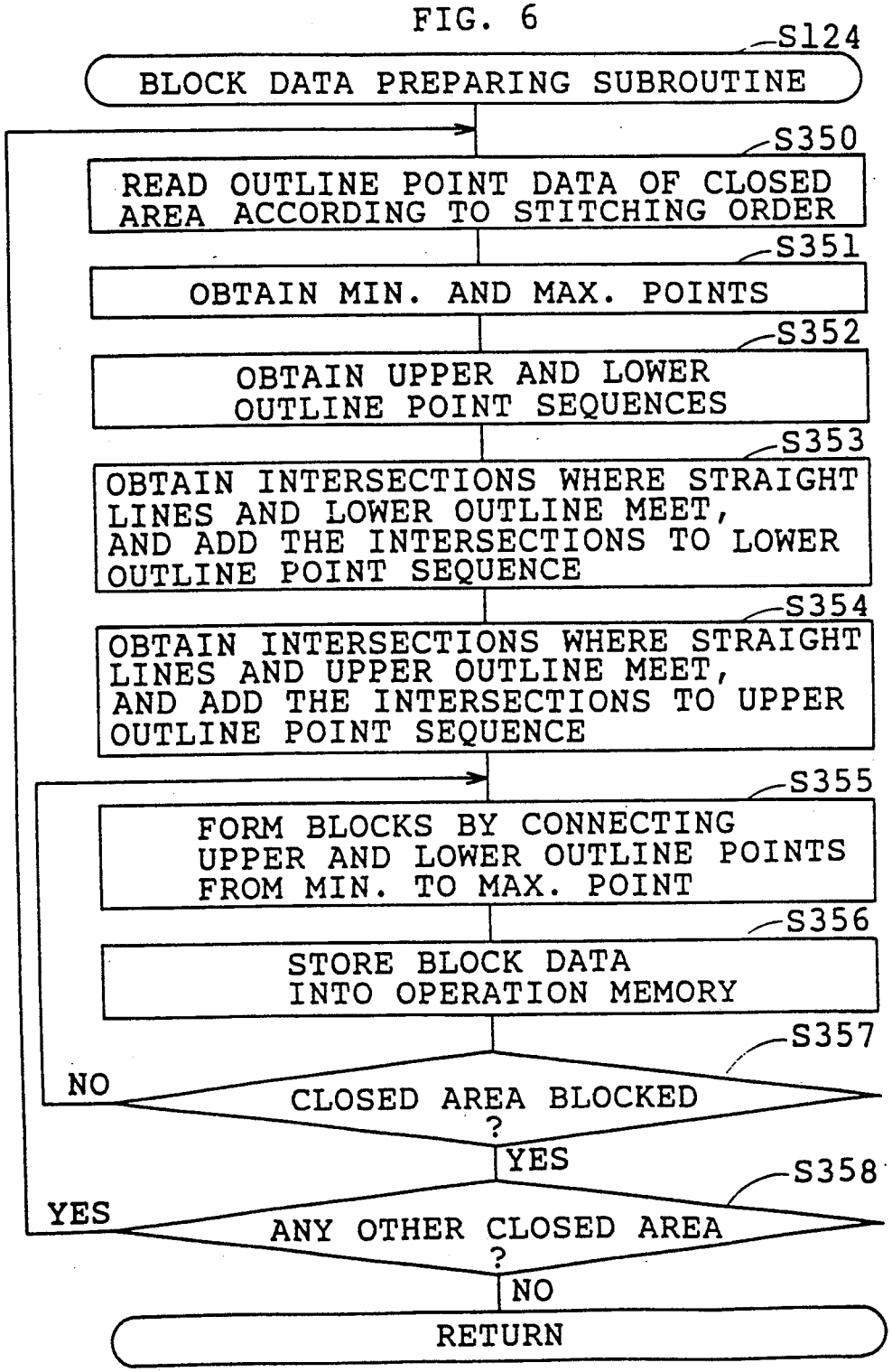

METHOD OF AND APPARATUS FOR PREPARING SEWING DATA FOR A MULTI-NEEDLE EMBROIDERY SEWING MACHINE

BACKGROUND OF THE INVENTION

The present invention relates to the preparing of sewing data for an embroidery sewing machine. More specifically, the present invention relates to a sewing machine that forms an embroidery pattern on a work by causing the relative movement between a vertically movable needle and the work based on needle location data showing the relative position of the needle and the work or based on block data that is related to the needle location.

A data preparing apparatus is disclosed in Japan Published Unexamined Patent Application No. 58-198375. In this related art, a drawing showing an embroidery design is adhered on a tablet board. An operator defines multiple closed areas for dividing the design. When the operator designates multiple points on the outlines of the defined closed areas with a cursor, the outlines of the closed areas are stored as defined. The needle location data for embroidering each stored closed area can thus be computed.

The needle location data is computed by moving a predetermined straight line parallel with a stitch-forming direction, sequentially obtaining intersections where the closed area outline and the straight line meet, and selectively storing the intersections as the needle location data.

Another data preparing apparatus is disclosed in Japan Published Unexamined Patent Application No. 63-132690. In this related art, the image of an embroidery design is picked up with a TV camera and displayed on a CRT. An operator designates given points on the outline of the displayed image on the CRT and sets the outline. Subsequently, the operator designates a dividing line for dividing the outline. When designating given points and dividing lines, the operator may use, for example, a light pen. The image of the embroidery design is thus divided into polygonal closed areas. Vertexes of the closed areas and other location data are sequentially computed and prepared as block data that is related to the needle location (hereinafter referred to as the block data). The needle location data indicating actual needle locations is then computed based on the block data and a predetermined stitch density data.

In these related arts, the operator must define the closed areas dividing the embroidery pattern and designate coordinate data such as vertexes of the closed areas with the cursor, the light pen or the like so that the defined closed areas are set and stored. When the closed areas are set, the data preparing apparatus computes and prepares the needle location data.

In the related arts, however, the operator must manually set the closed areas according to the configuration of the embroidery pattern. The setting of the closed areas is a troublesome and time-consuming operation. At the same time, the operator must set the closed areas having a configuration such that the computation of the needle locations is possible. The operator must be experienced in setting the closed areas. In the related art disclosed in Japan Published Unexamined Patent Application No. 58-198375, for example, when the operator sets an almost U-shaped closed area the closed-area outline and the straight line might meet at three or more intersections. Therefore, the needle location cannot be computed.

SUMMARY OF THE INVENTION

One object of this invention is to provide a data preparing apparatus for an embroidery sewing machine that can automatically prepare needle location data or the data related with needle location for forming embroidery stitches within an embroidery pattern surrounded with a continuous outline of a given configuration in a stitch-forming direction intersecting a length or width of the embroidery pattern at a predetermined angle.

To attain this object, this invention provides a control data preparing apparatus for an embroidery sewing machine that stitches an embroidery pattern on a workpiece under the control of control data. The control data preparing apparatus comprises a first memory means for storing outline data representing an outline of the embroidery pattern in a source coordinate system; a reference direction determining means for computing a reference direction based on the outline data, where the reference direction is in the same direction as either a length or a width of the embroidery pattern, a first computing means for dividing the outline of the embroidery pattern into divided outlines defined by dividing segments based on the outline data and the reference direction and for computing divided outline data representing the outlines of the divided outlines, where the dividing segments intersect the reference direction at a predetermined angle; a second computing means for computing control data from the divided outline data; and a second memory means for storing the control data.

BRIEF DESCRIPTION OF THE DRAWINGS

FIGS. 4A, 4B and 4C are flowcharts showing a closed-area dividing subroutine;

FIG. 5 is a flowchart showing a needle location data preparing subroutine;

FIG. 6 a flowchart showing a block data preparing subroutine;

DETAILED DESCRIPTION OF PREFERRED EMBODIMENTS

Figure 2:
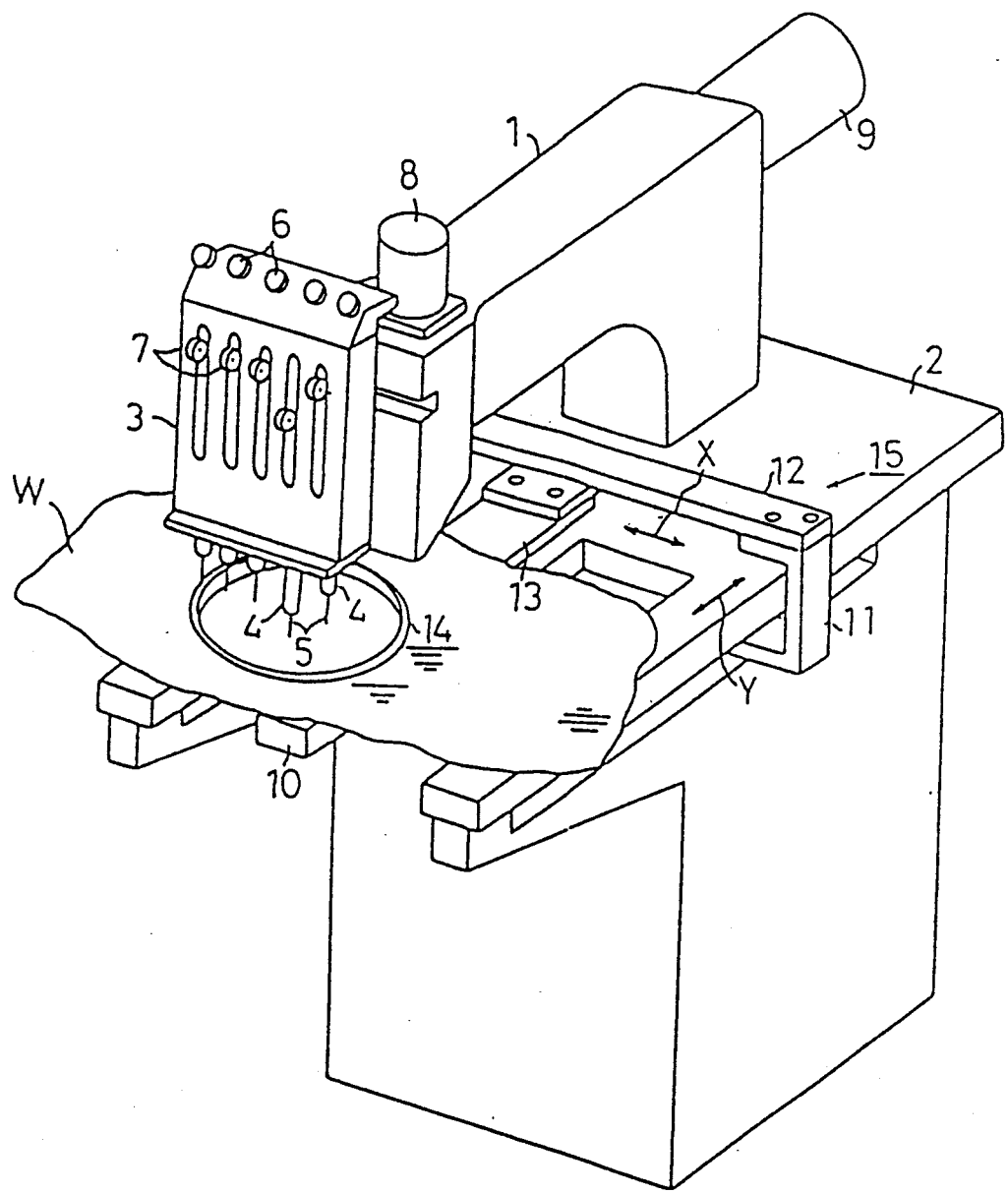
FIG. 2 is a perspective view of a multi-needle embroidery sewing machine to which the data preparing apparatus is mounted.

In this embodiment, data preparing apparatus of this invention is mounted on a multi-needle embroidery sewing machine shown in FIG. 2.

As shown in FIG. 2, an arm 1 is positioned on a table 2. A needle-bar support case 3 is supported on the front end of the arm 1 so that the needle-bar support case 3 can be moved in the direction shown by an arrow X. Five needle bars 4 are respectively supported by the needle-bar support case 3 so that the needle bars 4 are vertically movable. Needles 5 are detachably attached to the lower ends of each of the needle bars 4. Different kinds of thread are supplied from a notshown thread source via thread tension guides 6 and needle thread take-ups 7 on the needle-bar support case 3 to the needles 5, respectively. A needle-selecting motor 8 is provided on the arm 1 and is connected to the needle-bar support case 3. When a predetermined needle bar selecting signal is sent to the needle-selecting motor 8, the needleselecting motor 8 moves the needle-bar support case 3 and selectively positions one of the needles 5 at a predetermined application location.

A sewing-machine motor 9 is provided at the rear of the arm 1. The drive power of the sewing-machine motor 9 is transmitted through a not-shown transmission mechanism in the arm 1 to the positioned needle bar 4, thereby moving the needle bar 4 vertically. A bed 10 projects from the table 2, and is opposed to the positioned needle bar 4. The bed 10 has therein a not-shown thread-loop catcher for forming stitches on work W in cooperation with the needle 5. The needles 5 and the thread-loop catcher compose a stitchforming means.

A pair of Y-direction moving brackets 11 are provided at both sides of the table 2 so that the moving brackets 11 can reciprocate in the direction shown by arrow Y. The Y-direction moving brackets 11 are driven by a not-shown Y-direction drive motor. FIG. 2 shows only the bracket 11 at one side of the table 2. A support beam 12 is provided between the pair of the Y-direction moving brackets 11. The end of an X-direction moving member 13 is supported so that the X-direction moving member 13 can move in the direction shown by arrow X along the support beam 12. The X-direction moving member 13 is driven by a not-shown X-direction drive motor. A support ring 14 as a support means is provided on the X-direction moving member 13. The support ring 14 can be detachably attached to the work W, thus supporting the work W.

The Y-direction moving brackets 11, the Y-direction moving member 13, the support beam 12, and the X and Y-direction drive motors compose a feeder 15 for changing the relative position of the support ring 14 and the needle 5. The relative movement of the support ring 14 and the needle 5 results in the formation of embroidery stitches on the work W.

The electric structure of the embroidery sewing machine for this embodiment will now be explained.

Figure 1:
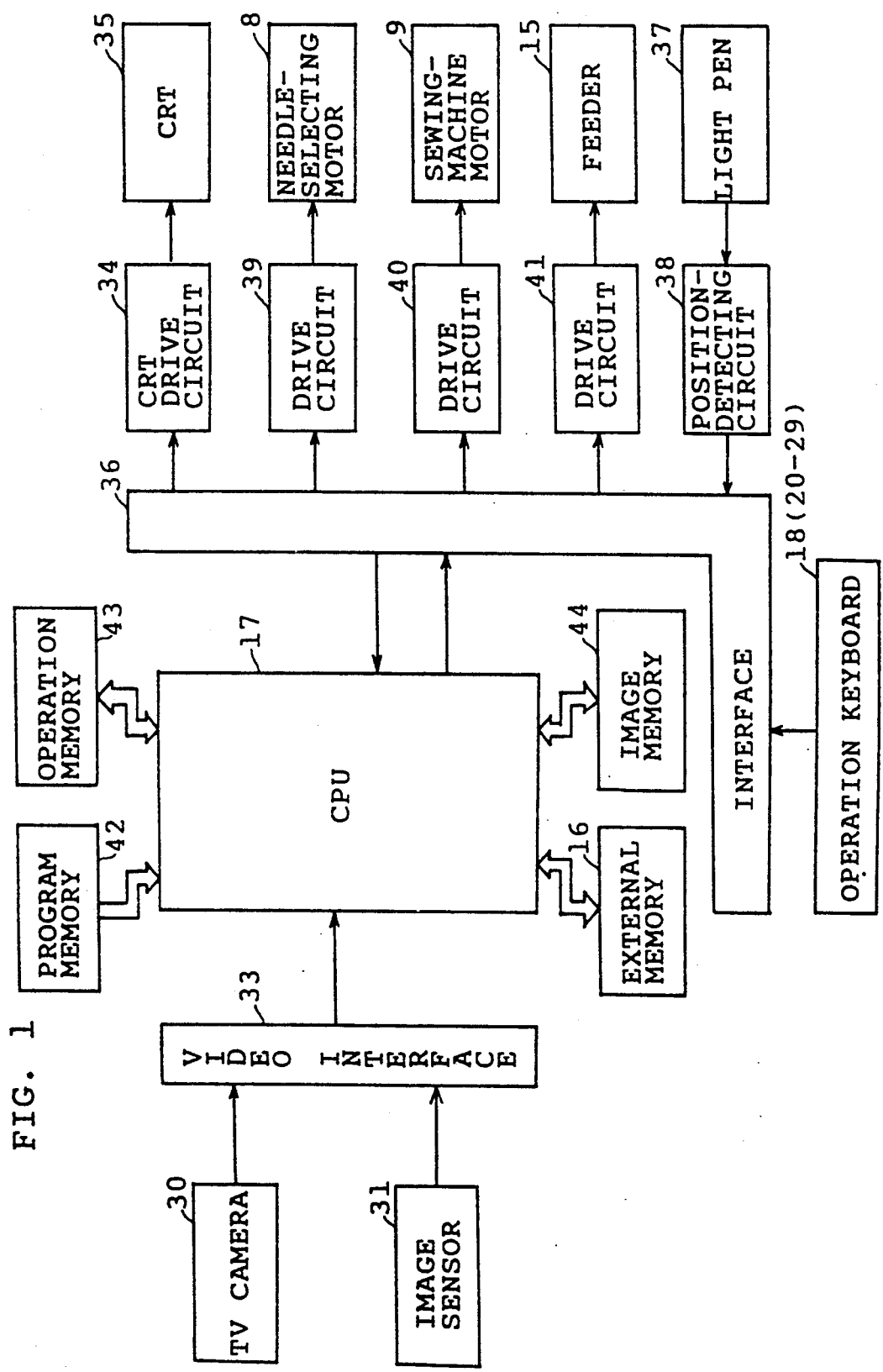
FIG. 1 is a block diagram of an electric structure of a data preparing apparatus constructed in accordance with the present invention.

As shown in FIG. 1, an operation keyboard 18 is connected to an interface 36 of a CPU 17. The operation keyboard 18 comprises a data-forming key 20, a needle location data key 21, a block data key 22, a stitching-order set mode key 23, an outline point input key 24, a closed area dividing command key 25, a stitching start key 26, and a reference direction set key 27. The needle-selecting motor 8, the sewing machine motor 9, and the feeder 15 are connected via drive circuits 39, 40, and 41, respectively, to the interface 36. A CRT 35 is also connected via a CRT drive circuit 34 to the interface 36. A light pen 37 for designating points on the image on the screen of the CRT 35 is connected via a position-detecting circuit 38 to the interface 36. A TV camera 30 for projecting the image of embroidery design and an image sensor 31 are respectively connected via a video interface 33 to the CPU 17. A program memory 42, an operation memory 43, an external memory 16, and an image memory 44 are connected to the CPU 17. The operation program of the CPU 17 is stored in the program memory 42. The operation memory 43 mainly composing first and second memory means is readable and writable. The external memory 16 stores needle location data or block data that is related to the needle location (hereinafter referred to as the block data). The image memory 44 stores the embroidery image picked up by the TV camera 30, and the position data of the designated points are displayed on the screen of the CRT 35.

Figure 7:
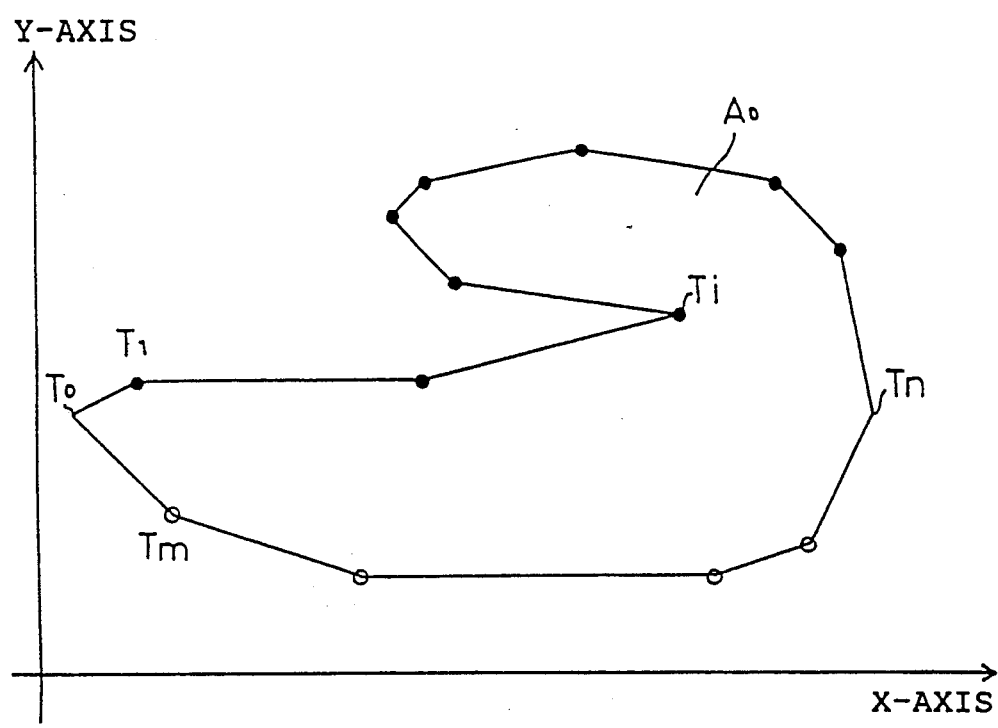
FIG. 7 is an explanatory drawing of a closed area Ao to embroider.

The operation of the CPU 17 for preparing the needle location data or the block data so as to embroider a pattern shown in FIG. 7 will now be explained referring to flowcharts in FIGS. 3A through 3C, 4A, 4B and 4C.

First, a given embroidery pattern consists of one continuous outline forming a given configuration. The data preparing apparatus of this invention automatically prepares the needle location data or the block data for forming embroidery stitches along a stitch-forming direction within the outline. The stitch-forming direction intersects a length or a width of the embroidery pattern at a predetermined angle.

After the operator sets the embroidery design, a detection signal from the TV camera 30 or the image sensor 31 is transmitted to the CPU 17. After the needle location data key 21 or the block data key 22 is turned on, the dataforming key 20 is turned on. The CPU 17 thus starts operation according to the flowcharts in FIGS. 3A through 3C. When the needle location data key 21 is turned on, the needle location data preparing flag is set to one.

At step S100 the CPU 17 displays the image of the embroidery design from the TV camera 30 or the image sensor 31 on the CRT 35 and stores image data into the image memory 44. Subsequently, the operator designates a given point Ti on the outline of the image displayed on the CRT 35 by using the light pen 37 and presses the outline point input key 24. At step S102, the CPU 17 obtains the location data of the point Ti designated by the light pen 37, stores Ti as outline-point data into the operation memory 43, and stores the location data into the image memory 44. When the operator repeats this operation along the outline, the outline-point data is sequentially stored. A sequence of points To,...Ti,...Tn,...,Tm shown in FIG. 7 is stored as the outline data of embroidery closed area Ao into the operation memory 43. Respective points are connected with a straight line or a curved line and are displayed on the CRT 35.

When the operator turns on the reference direction set key 29, the process goes to step S103 where the CPU 17 sets a reference direction as follows. First, the CPU 17 reads the outline-point data from the operation memory 43 and searches a point sequence To,...Ti,...Tn indicated by the outline-point data for all the possible pairs of outline points. The pair of outline points which has the longest distance therebetween is selected. When a pair of lines passing the respective outline points of the selected pair and extending perpendicularly to a straight line connecting the respective outline points is assumed, all the other outline points should be between the assumed pair of lines. The direction in which the straight line connects the selected pair of the outline points corresponds to a length of a closed area indicated by the outline-point data. The closed area corresponds to the embroidery pattern. On the other hand, when at step S103 the pair of outline points which has the shortest distance therebetween is selected and all the other points are between the assumed pair of lines, the direction in which the straight line extends corresponds to a width of the closed area.

At step S103 the CPU 17 thus sets and stores the length or the width of the closed area as the reference direction. Subsequently, the CPU 17 computes an angle $\theta$ between the reference direction and X-axis of X,Y-coordinate system which defines the outline-point data.

At step S104 the CPU 17 determines whether the closed-area dividing command key 25 is turned on. When the closed-area dividing command key 25 is turned on, the CPU 17 reads outline-point data from the operation memory 43. At step S105 the CPU 17 rotates the outline-point data by the angle $\theta$ so that the reference direction of the closed area corresponds to the X-axis and stores the rotated outline-point data into the operation memory 43. The rotated outline-point data is hereinafter referred to as the outline-point data. In this embodiment, the stitch-formning direction is at a right angle to the length of the embroidery pattern.

Subsequently, at step S106, the CPU 17 sequentially reads the outline-point data of the closed area Ao To,...Tm, and obtains a MAX. point Tn having the maximum X-axis value and a MIN. point To having the minimum X-axis value.

Next, at step S108, based on outline data To,...Tm, the CPU 17 sets a line connecting the MIN. and MAX. points and composed of the points To,...,Ti,...,Tn as upper outline point sequence Ui. At step S110, the CPU 17 sets the other line connecting the MIN. and MAX. points and composed of the points To,Tm, ...Tn as lower outline point sequence di. The process of the CPU 17 goes to step S200 which is a closedarea dividing subroutine described later. When the closed area is divided into two in the subroutine, the process goes to step S112. At step S112 it is determined whether the closed area is divided. When the CPU 17 cannot divide the given closed area into two at step S200, the outline-point data of the closed area and the closed-area dividing end flag are stored in the operation memory 43.

Until the answer at step S112 becomes affirmative, thereby storing the closed-area dividing end flag into the operation memory 43, the CPU 17 repeats steps S106 through S110 and S200. After finishing the dividing of the closed area, at step S114 the image of the divided closed areas is displayed on the CRT 35.

The closed-area dividing subroutine at step S200 will now be explained. The purpose of the closed-area dividing subroutine is to divide the closed area to make possible the operation of a needle location data preparing subroutine at step S122 and of a block data preparing subroutine at step S124 described later.

In general, the closed area is divided based on the existence of expected dividing points among the outline data To,...,Tm. Referring to FIGS. 7 through 13, expected dividing points are determined according to the following rules: a point Ui is an expected dividing point if (1) $Uxi > Uxi-1$, $Uxi > Uxi+1$, and $Uxi+1$ is above a line defined by Ux and $Ux-1$; or (2) $Uxi < Uxi-1$, $Uxi < Uxi+1$, and $Ux+1$ is below a line defined by Ux and $Ux-1$.

For each expected dividing point, a line segment $\overline{UiP}$ or $\overline{dip}$ between the expected dividing point and a point p is determined. The line segments $\overline{UiP}$ and $\overline{dip}$ are part of a line parallel to the Y-axis containing the expected dividing point. When an expected dividing point Ui is along an upper outline point sequence composed of points To,...,Ti,...,Tn, point P is at the intersection of the line parallel to the Y-axis and containing the expected dividing point Ui and the outline above and nearest to the expected dividing point. However, when an expected dividing point di is along a lower outline point sequence composed of points To,...,Tm,...,Tn, point p is at the intersection of the line parallel to the Y-axis containing the expected dividing point di and the outline below and nearest to the expected dividing point.

Each line segment $\overline{UiP}$ or $\overline{dip}$ divides the closed area into smaller closed areas.

Figure 4B:
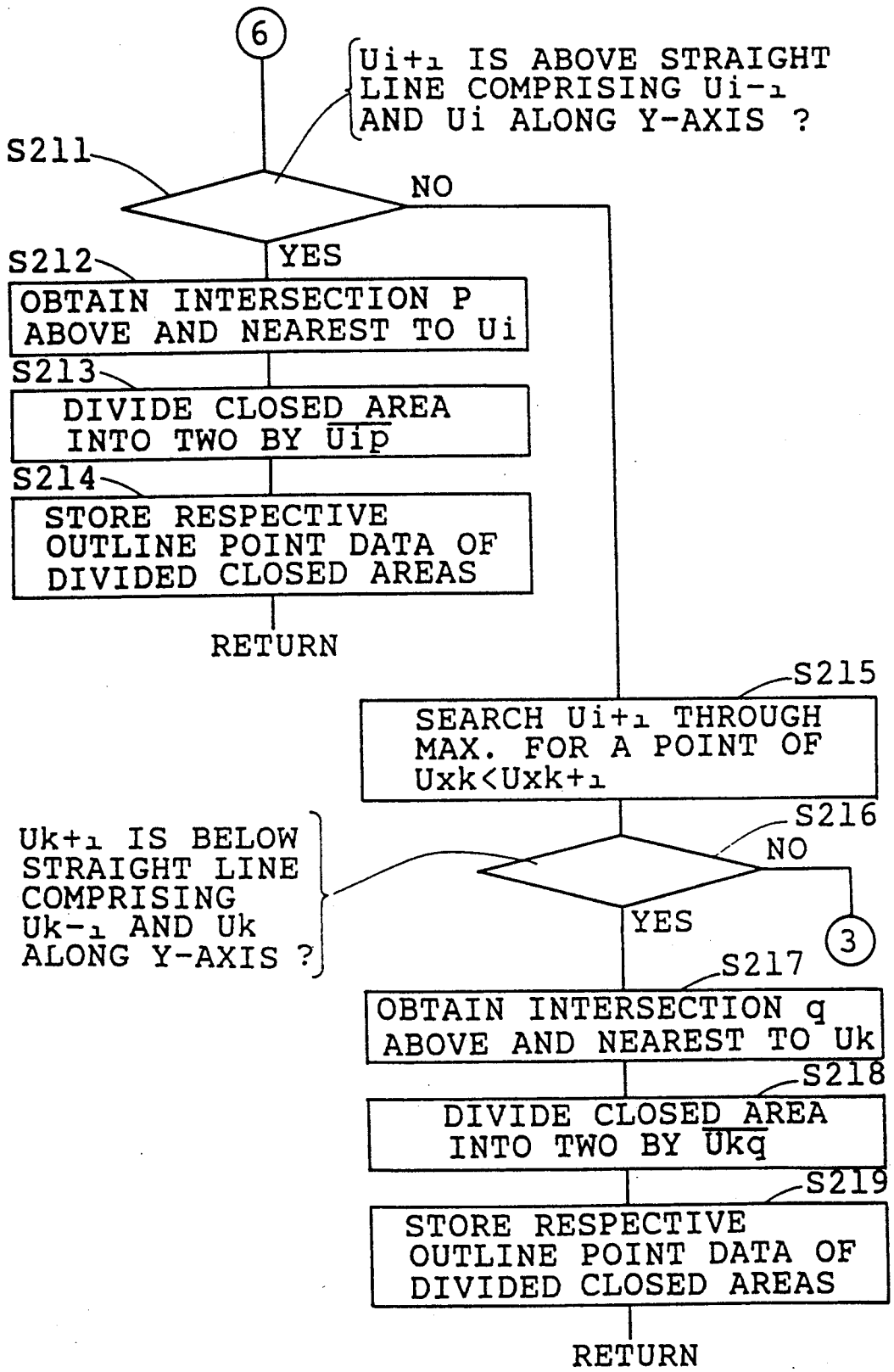
Figure 4C:
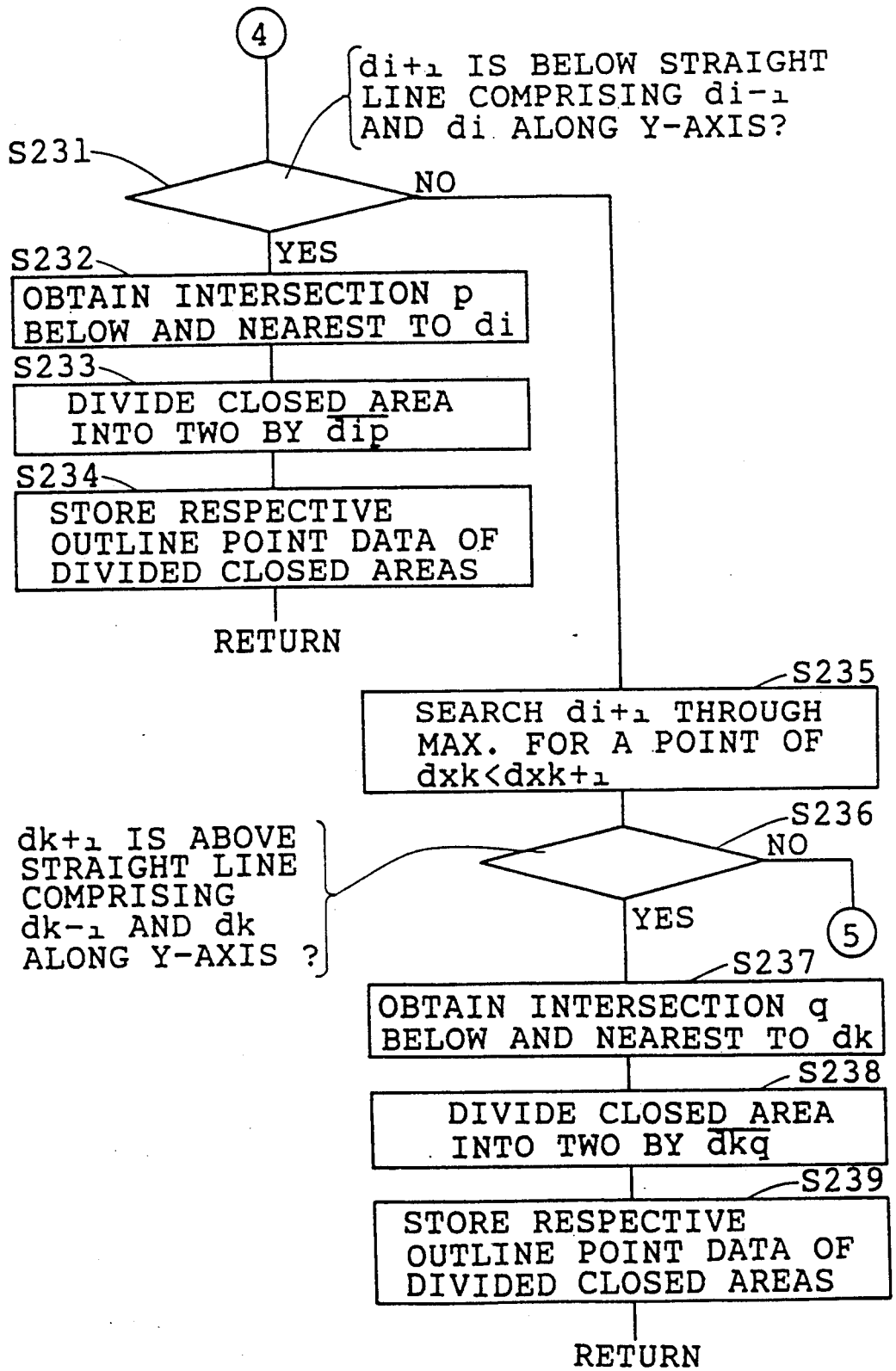

The closed-area dividing subroutine will be explained in detail below referring to the flowcharts in FIGS. 4A, 4B and 4C.

Figure 8:
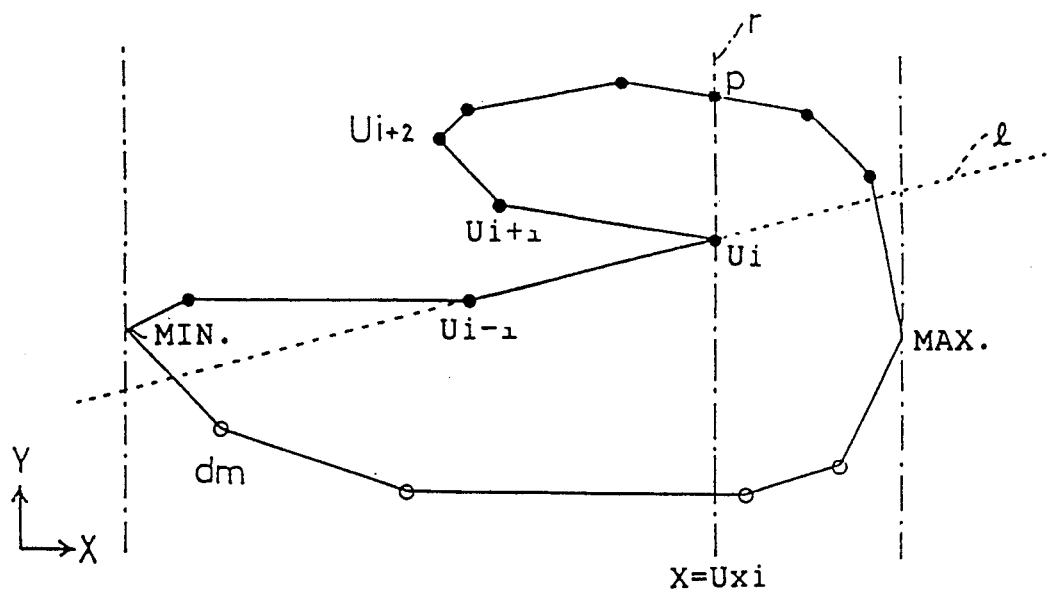
FIGS. 8 and 9 are explanatory drawings showing the dividing of the closed area Ao.

At step S210, the CPU 17 compares X-axis values Uxi of adjoining points in the upper outline point sequence sequentially from the MIN. through the MAX. point. The CPU 17 thus searches the upper outline point sequence for an expected dividing point having the relationship in X-axis value of $Uxi > Uxi+1$. Specifically, for the closed area Ao in FIG. 7, a point Ui shown in FIG. 8 is obtained as the expected dividing point. When no other expected dividing points exist on the upper outline point sequence, the process goes to step S230. At step S230 the CPU 17 compares X-axis values dxi of adjoining points in the lower outline point sequence sequentially from the MIN. through the MAX. point. The CPU 17 thus searches the lower outline point sequence for an expected dividing point having the relationship in X-axis value of $dxi > dxi+1$. If no further expected dividing points exist on the lower outline point sequence, either, the CPU 17 determines that the given closed area cannot be divided further. The CPU 17 thus determines that the operations of the needle location data preparing subroutine and the block data preparing subroutine can be executed. At step S240 the CPU 17 stores the closed-area dividing end flag as well as the outline-point data into the operation memory 43, and the program goes to step S114.

Figure 9:
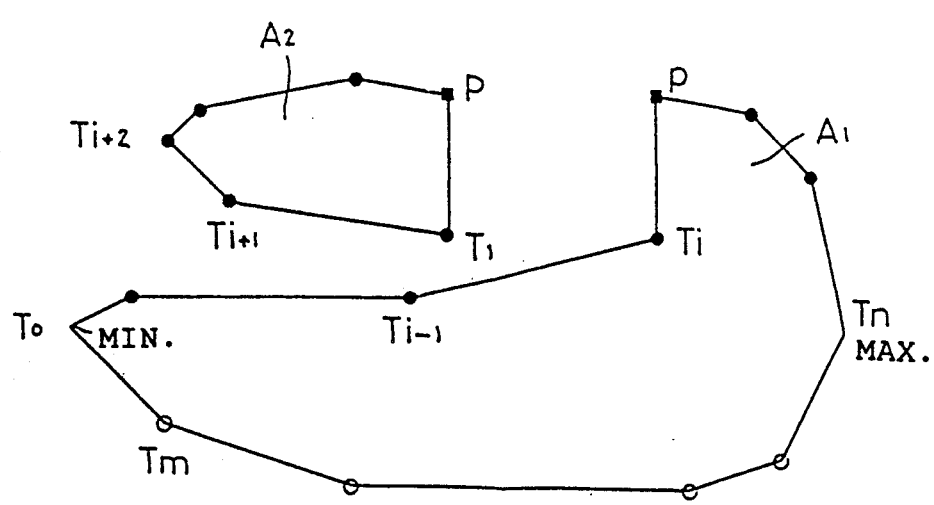

When the expected dividing point exists on the upper outline point sequence at step S210, it is determined at step S211 whether a point $Uxi+1$ subsequent to the expected dividing point Ui is above a straight line comprising the expected dividing point Ui and its preceding point $Ui-1$ along the Y-axis, as shown in FIG. 8. When the answer at step S211 is affirmative, step S212 obtains an intersection P above and nearest to the expected dividing point Ui from intersections where the straight line and the closed-area outline meet. The straight line r is represented by equation of $X = Uxi$ and extends past the expected dividing point Ui and parallel with Y-axis as shown in FIG. 8. Subsequently, at step S213, the CPU 17 divides the closed area Ao into A1 and A2, as shown in FIG. 9, by segment $\overline{UiP}$ connecting the expected dividing point Ui in FIG. 8 and the intersection P. At step S214, the CUP 17 stores respective outline-point data of the divided closed areas A1 and A2 into the operation memory 43. For example, as shown in FIG. 9, the outline-point data To, ...Ti,P, ...Tn of the closed area A1 and the outline-point data Ti, Ti+1, Ti+2, ...P of the closed area A2 are obtained.

Figure 10:
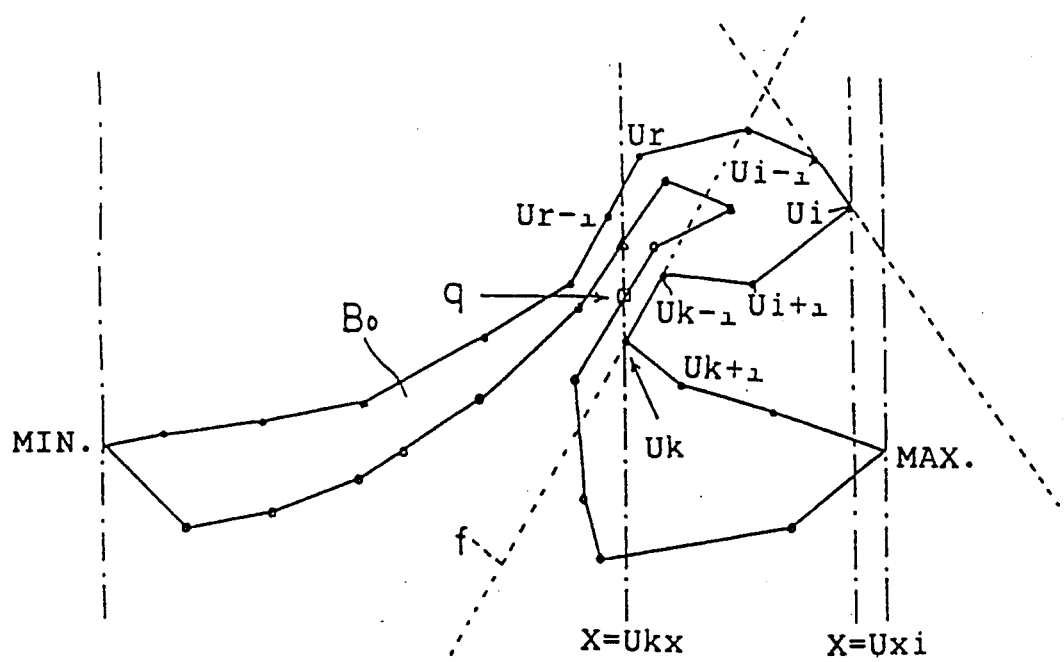
FIGS. 10 and 11 are explanatory drawings showing the dividing of a closed area Bo to embroider.

On the other hand, when the answer at step S211 is negative, as occurs in FIG. 10, the CPU 17 cancels the designation of the expected dividing point from a point Ui of a closed area Bo obtained at step S210, because the closed area B° cannot be divided by a straight line represented by equation X=Uxi. Subsequently, at step S215, the CPU 17 compares X-axis values Uxk of adjoining point in the upper outline point sequence from the point Ui+1 to a MAX. point, and obtains an expected dividing point Uk where decreased X-axis value begins to increase. Specifically, the point Uk has a relationship in X-axis value of Uxk<Uxk+1.Subsequently, it is determined at step S216 whether a point Uk+1 subsequent to the expected dividing point Uk is below a straight line f passing the expected dividing point Uk and its preceding point Uk−1 along the Y-axis. When the point Uk+1 is below the straight line f, at step S217, an intersection q above and nearest to the expected dividing point Uk is obtained from intersections where the straight line extending past the expected dividing point Uk parallel with the Y-axis and the closed area outline meet. The straight line is represented by equation of X=Uxk. Subsequently, at step S218, the CPU 17 divides the closed area B° in FIG. 10 into two areas B1 and B2 in FIG. 11 by segment $\overline{Ukq}$ connecting the expected dividing point Uk and the intersection q. At step S219, the CPU 17 stores respective outline-point data of the divided closed areas B1 and B2 into the operation memory 43.

Figure 13:
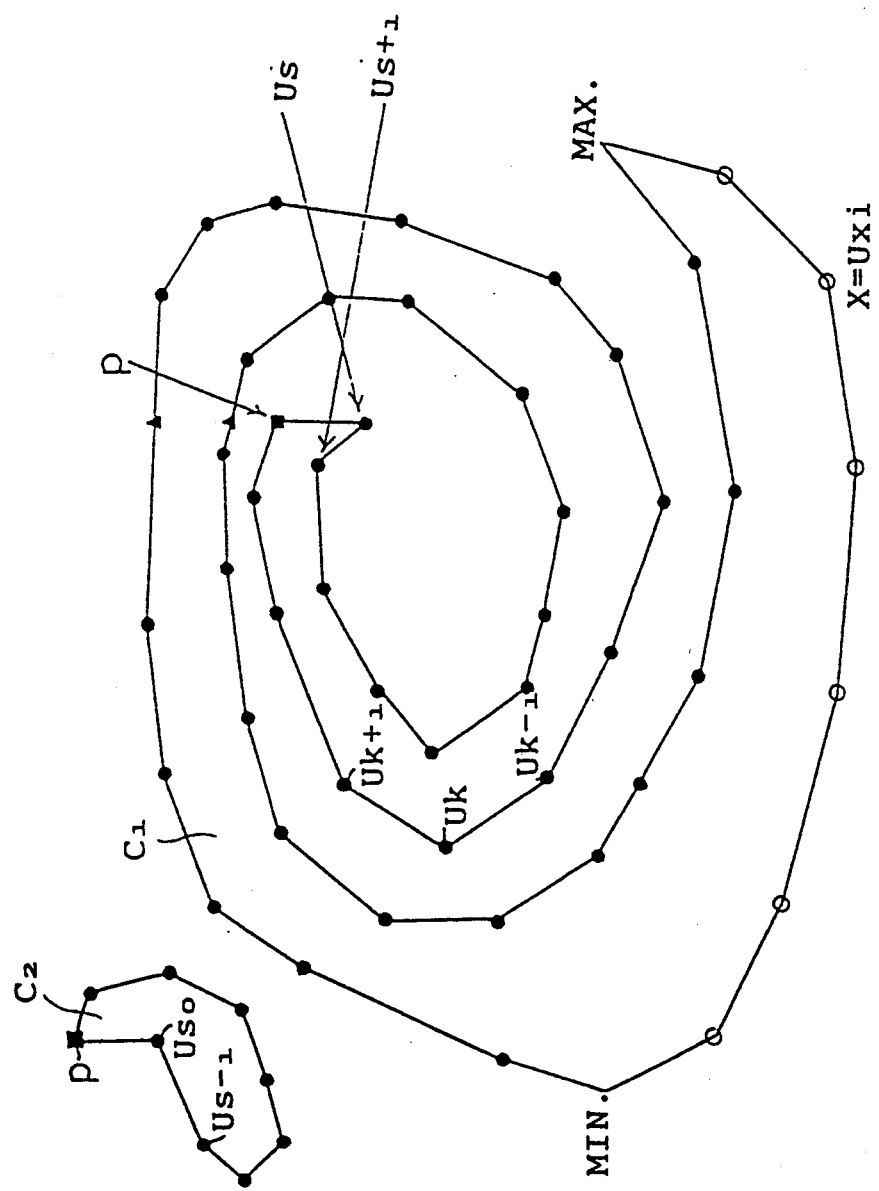

On the other hand, if the answer at step S216 is negative, the CPU 17 cancels the designation of the expected dividing point from the point Uk obtained at step S215. The process returns to step S210 where the CPU 17 distinguishes the X-axis values from an upper outline point Uk+1 subsequent to the point Uk obtained at step S215. For example, a closed area Co in FIG. 12 results in the negative determination at step S216. After step S210 obtains an expected dividing point Ue of the closed area Co, the answer at step S211 is negative. Subsequently, after step S215 obtains an expected dividing point Um, the answer at step S216 is negative. Subsequently, step S210 obtains an expected dividing point Us, and the answer at step S211 is affirmative for the first time. As a result, at step S213, as shown in FIG. 13, the closed area Co is divided into two closed areas C1 and C2 by a segment $\overline{UsP}$ passing the expected dividing point Us and an intersection P.

Through steps S210 through S219, the upper outline of any configuration can be divided.

On the other hand, when the answer at step S210 is negative, the process goes to step S230. Specifically, the CPU 17 searches the upper outline of a given closed area from the MIN. to the MAX. point, but cannot find a point of Uxi>Uxi+1 where the increasing X-axis value starts decreasing. The CPU 17 then carries out the operation of steps S231 through S239 regarding the lower outline obtained at step S110. The operation of steps S231 through S239 corresponds to that of the aforementioned steps S210 through S219. However, the operation of steps S231, S232, S236 and S237 is different from that of steps S211, S212, S216 and S217. Only the different operation will now be explained, referring to the flowchart in FIG. 4C.

Figure 11:
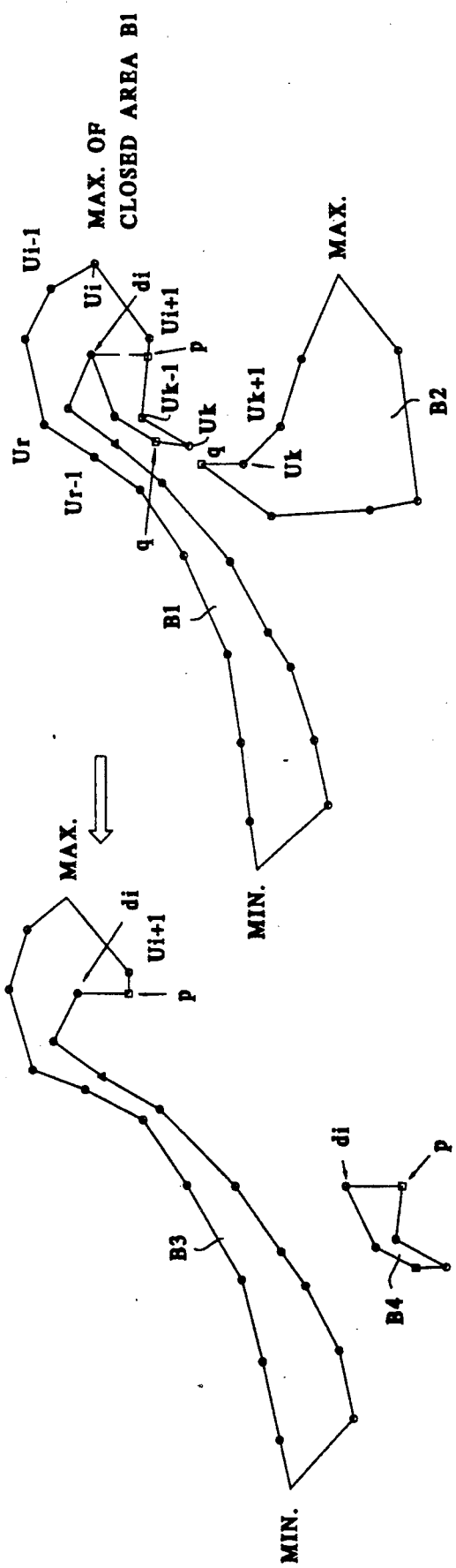
Figure 12:
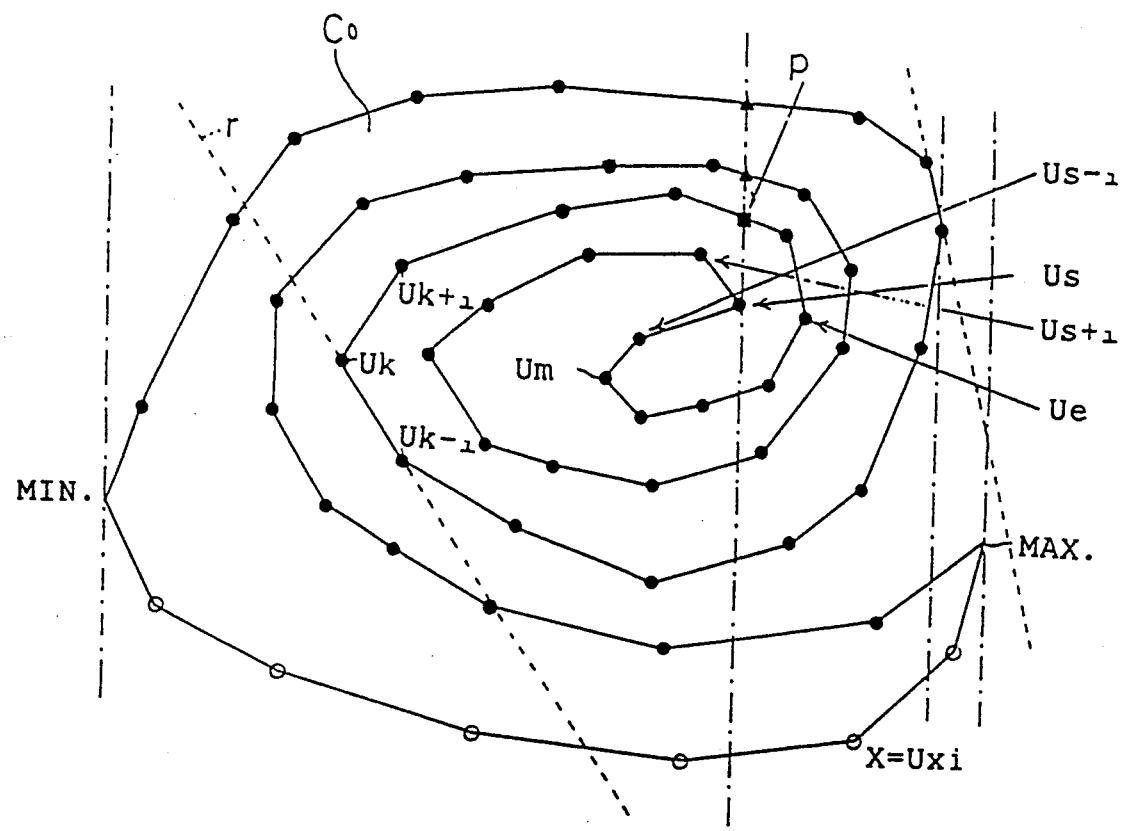
FIGS. 12 and 13 are explanatory drawings showing the dividing of a closed area Co to embroider.

At step S231, as shown in FIG. 11, the CPU 17 determines whether a point di+1 subsequent to the expected dividing point di obtained at step S230 is below a straight line passing the point di and its preceding point di1 along the Y-axis. When the answer at step S231 is affirmative, at step S232 the CPU 17 obtains an intersection p below and nearest to the expected dividing point di from intersections where a straight line extending past the expected dividing point di parallel with the Y-axis and the closed area outline meet. The straight line can be represented by the equation of X=dxi. This operation can be applied to the closed area B1 shown in FIG. 11, for example. The closed area B1 is divided into two areas B3 and B4 by a segment $\overline{dip}$.

On the other hand, when the answer at step S231 is negative, the CPU 17 searches the lower outline point sequence from lower-outline point di+1 through the MAX. point for an expected dividing point dk where the decreasing X-value starts increasing. Subsequently, at step S236 the CPU 17 determines whether a point dk+1 subsequent to the expected dividing point dk is above a straight line comprising the expected dividing point dk and its preceding point dk−1 along the Y-axis. When the answer at step S236 is negative, the CPU 17 returns to step S230. When the answer at step S236 is affirmative, the CPU 17 obtains an intersection q below and nearest to the expected dividing point dk from intersections where a straight line extending past the expected dividing point dk parallel with the Y-axis and a closed area outline meet. The straight line is represented by equation of X=dxk.

Through steps S230 through S239, the lower outline with any configuration can thus be divided.

By repeating steps S106 through S110 and S200, for example, the closed area Ao is divided into A1 and A2, and the closed area Bo is divided into B2, B3 and B4.

After finishing the dividing of the closed areas, at step S114 the CPU 17 displays the image of all the obtained closed areas on the CRT 35. The process then goes to a stitching-order determining routine S115. At step S115 the operator presses the stitching-order set mode key 23, and selects the closed area with the light pen 37. The stitching order of each closed area is thus stored in the operation memory 43.

Subsequently, at step S120 the CPU 17 determines whether the needle location data preparing flag is set to one or not. When the answer at step S120 is affirmative, the process goes to the needle location data preparing subroutine at step S122. On the other hand, when the answer at step S120 is negative, the process goes to the block data preparing subroutine at step S124.

Figure 14:
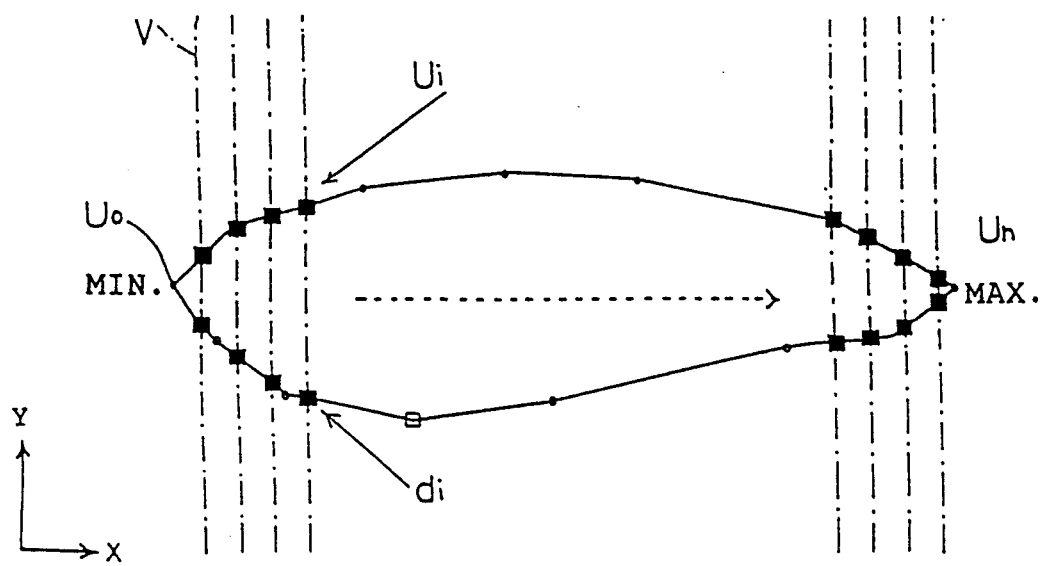
FIG. 14 is an explanatory drawing showing the preparing of needle location data.

The needle location data preparing subroutine will now be explained, referring to FIGS. 5 and 14. First, the CPU 17 reads the outline-point data of each closed area according to the determined stitching order at step S300, and obtains MIN. and MAX. points from the outline-point data at step S301. Subsequently, at step S302 the CPU 17 obtains upper and lower outlines extending from the MIN. to the MAX. point. At step S303 the CPU 17 obtains a straight line V extending past the MIN. point parallel with Y-axis. The straight line V is represented by equation of X=Uxo. At step S304 the CPU 17 obtains as needle location data intersections where the straight line V and the upper outline meet and where the straight line V and the lower outline meet. Subsequently, at step S305 the CPU 17 stores the needle location data into the operation memory 43. At step S306 the CPU 17 moves the straight line V by pitch d corresponding to the predetermined stitching density toward the MAX. point. It is determined at step S307 whether the straight line V exceeds the MAX. point.

The straight line V is moved by the predetermined pitch d from the MIN. to the MAX. point until the answer at step S307 becomes affirmative. Every time the straight line V moves, the intersections are sequentially stored as the needle location data into the operation memory 43. It is determined at step S308 whether there is any other closed area or not. By repeating steps S300 through S307 until the answer at step S308 becomes negative, the needle location data for stitching each closed area can be prepared.

Figure 15:
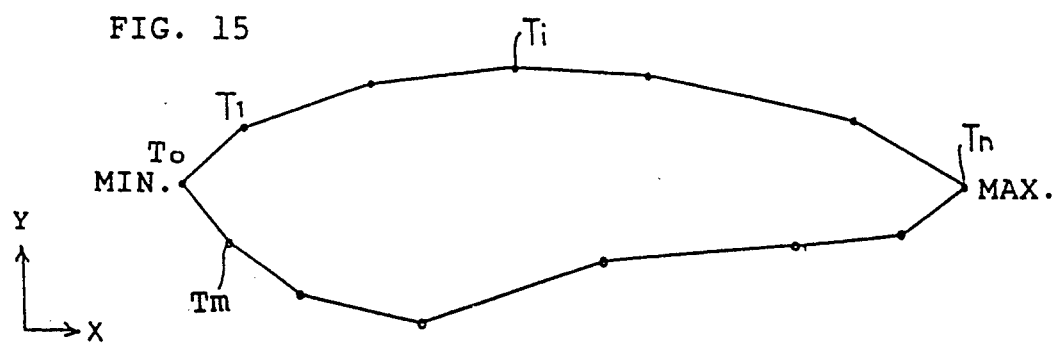
FIGS. 15 through 19 are explanatory drawings showing the preparing of block data.
Figure 16:
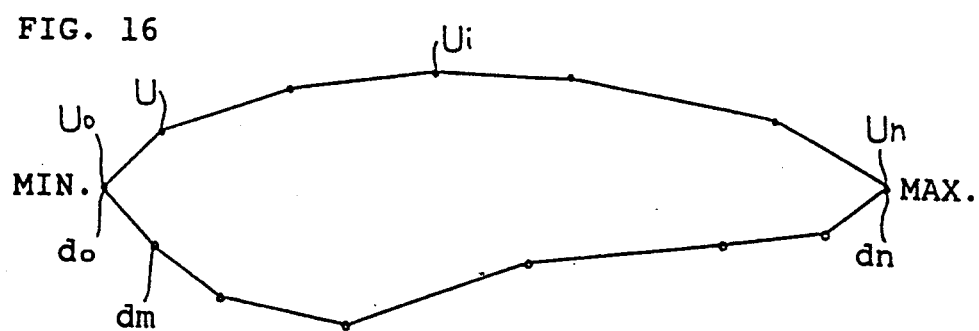

The block data preparing subroutine will now be explained, referring to FIGS. 6, 15 through 19. First, at step S350 the CPU 17 reads the outline-point data of the closed area from the operation memory 43 according to the stitching order. At step S351, as shown in FIG. 15, the CPU 17 obtains a point To having a minimum X-axis value as a MIN. point and a point Tn having a maximum X-axis value as a MAX. point. At step S352, as shown in FIG. 16, the CPU 17 obtains two paths extending from the MIN. to MAX. point as upper outline point sequence Uo, U1, ...Ui, ...Un, and lower outline point sequence do, dm, ...dn.

Figure 17:
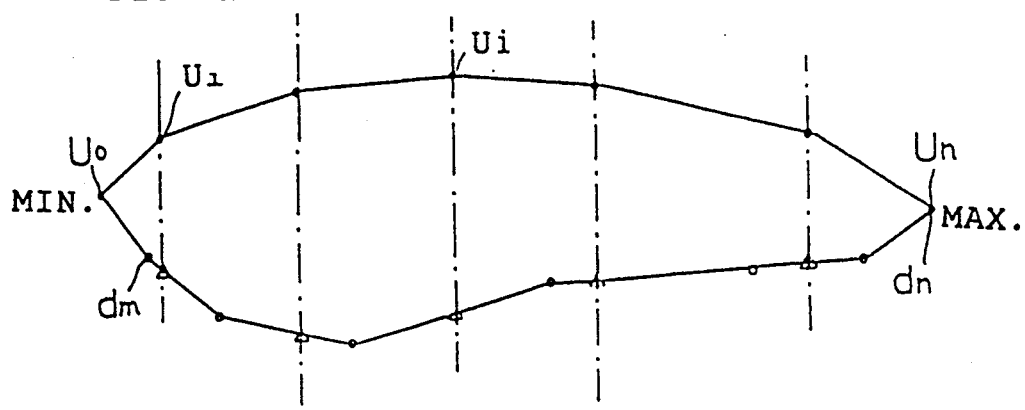
Figure 18:
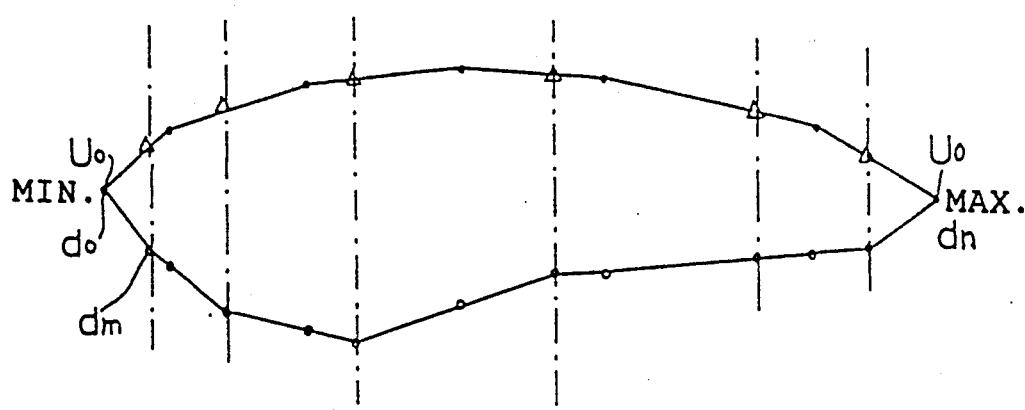

Subsequently, at step S353, as shown in FIG. 17, the CPU 17 sets straight lines passing respective points of the upper outline point sequence Uo, U1, ...Ui, ...Un parallel with the Y-axis, obtains intersections where the respective straight lines and the lower outline meet, and adds the intersections to the lower outline point sequence. Subsequently, at step S354, as shown in FIG. 18, the CPU 17 sets straight lines passing the respective points of the lower outline point sequence do, dm, ...dn parallel with Y-axis, obtains intersections where the respective straight lines and the upper outline meet, and adds the intersections to the upper outline point sequence. The number of the data in the upper outline point sequence thus equals that of the data in the lower outline point sequence.

Figure 19:
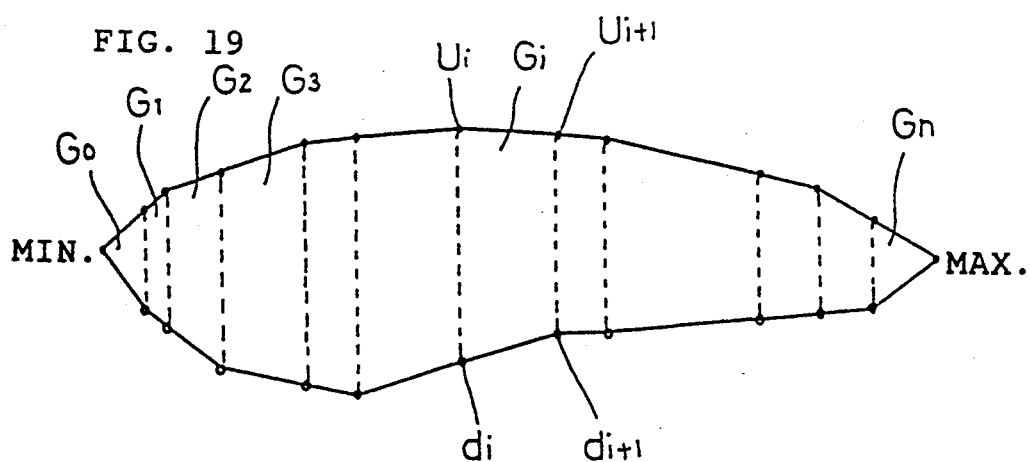

At step S355, as shown in FIG. 19, the CPU 17 forms multiple blocks Go through Gn from the MIN. toward the MAX. point by connecting the upper and lower outline points having the same sequence numbers. At step S356 the CPU 17 alternately stores upper and lower outline points representing a vertex of each block as block data into the operation memory 43. For example, the CPU 17 stores points Ui, di ,Ui+1, then di+1 as the block data of a block Gi into the operation memory 43. It is determined at step S357 whether the closed area has been blocked, and at step S358 whether there exists any other closed area. The closed area is divided into multiple blocks Go through Gn until the answer at step S357 becomes affirmative. The vertexes of each block are thus prepared as the block data until the answer at step S358 becomes negative.

After the needle location data preparing subroutine at step S122 has been finished, at step S123 the CPU 17 displays a simulated stitching pattern on the CRT 35. After the block data preparing subroutine at step S124 has finished, at step S123 the CPU 17 displays all the blocks on the CRT 35. Subsequently, it is determined at step S125 whether a correction signal is sent from the operation keyboard 18. When the correction signal is sent, the process goes to step S126 which carries out a predetermined correction such as the modification of the block data. When no correction signal is sent, the process goes to step S127. At step S127 the CPU 17 rotates the block data or the needle location data by angle $-\theta$. Therefore, the block data or the needle location data is returned to the coordinate system which defines the outline-point data of the embroidery pattern.

Subsequently, the process goes to a needle thread code selecting routine at step S128 where the needle bar number of each divided closed area is input.

Consequently, the CPU 17 prepares the stitching data consisting of the block data, the stitching-order data and the needle-thread code, or the stitching data consisting of the needle location data, the stitching-order data and the needle-thread code.

STITCHING MODE

Figure 3A:
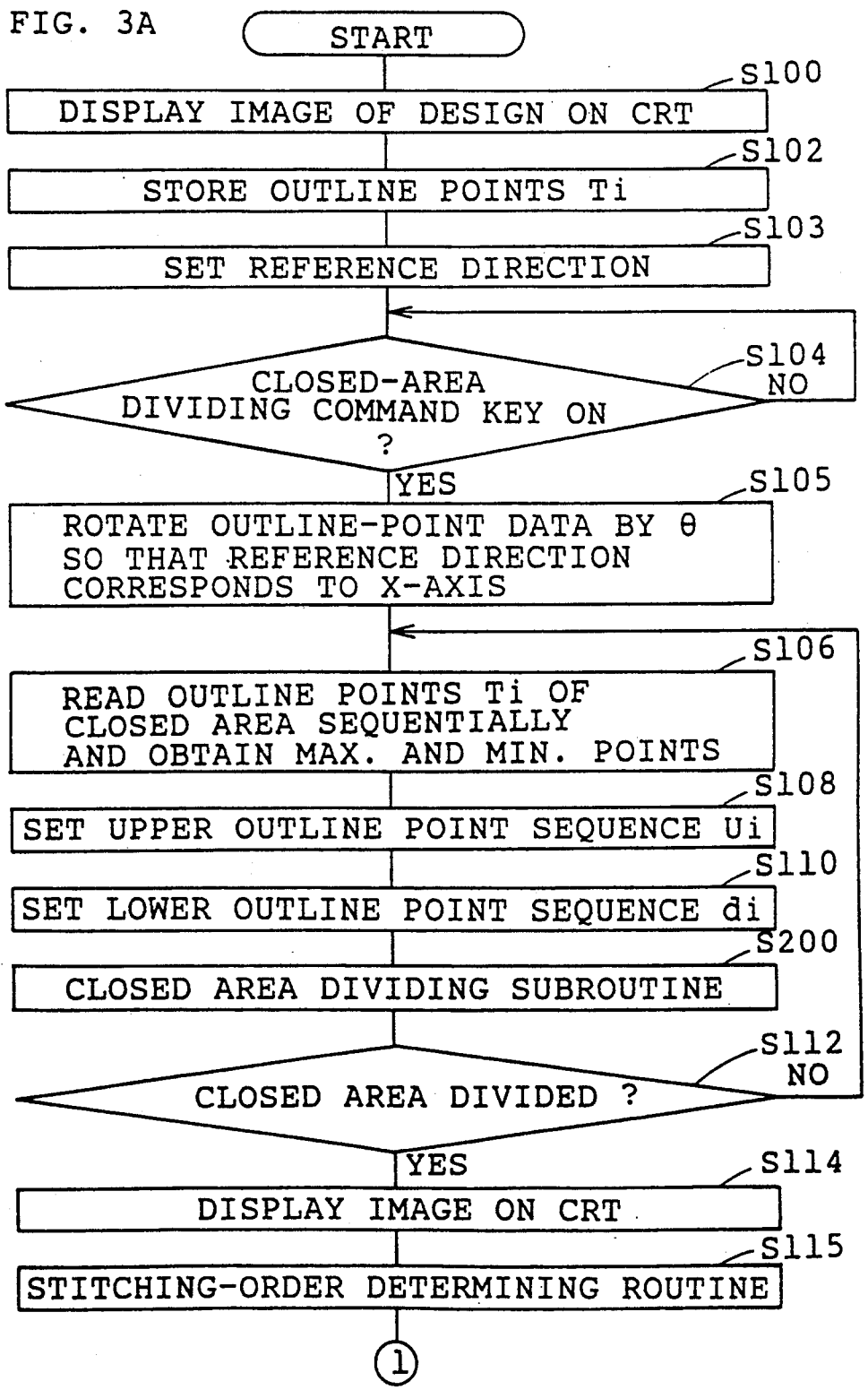
FIGS. 3A through 3C are flowcharts showing main operations of a CPU.
Figure 3B:
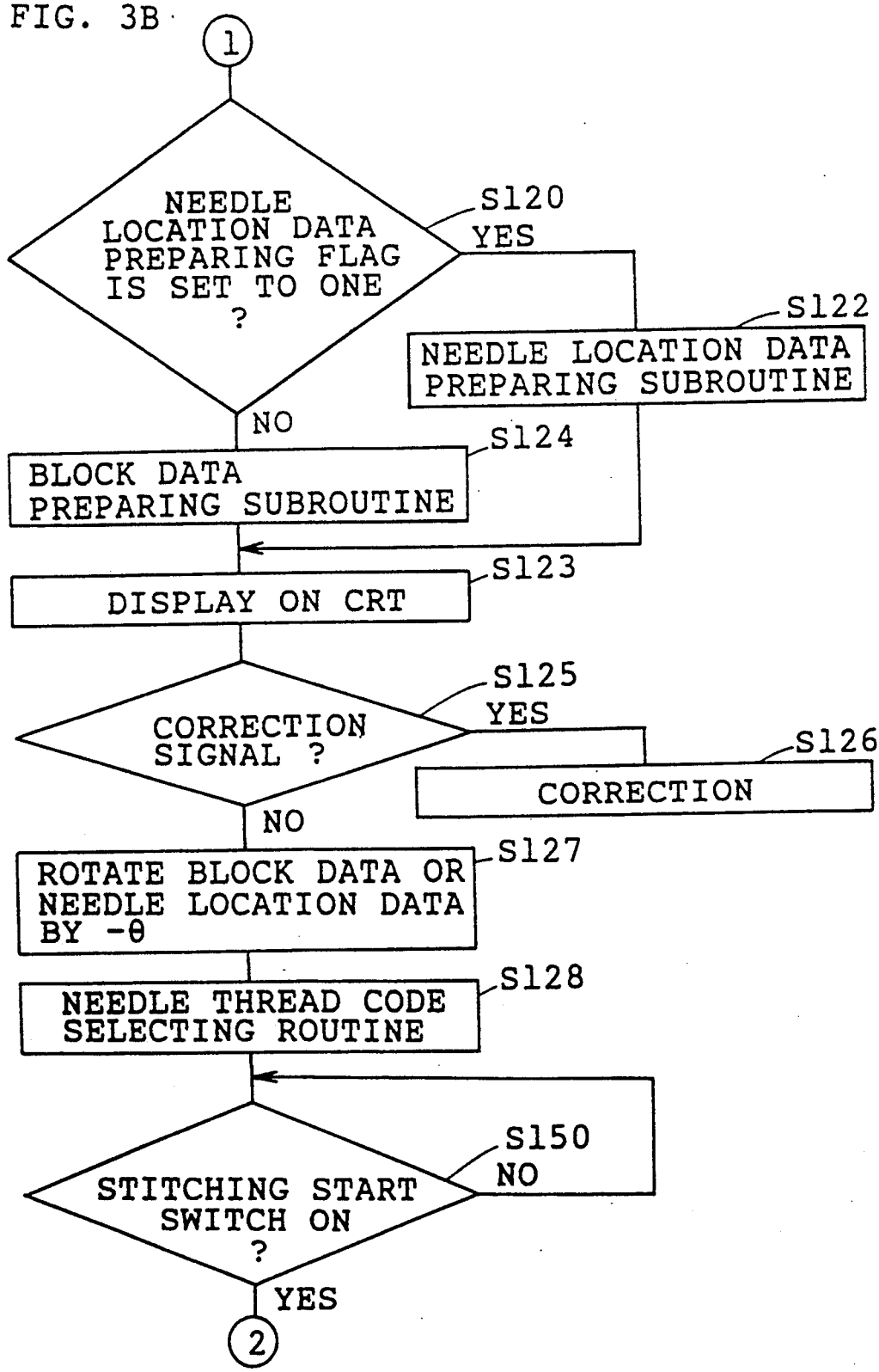
Figure 3C:
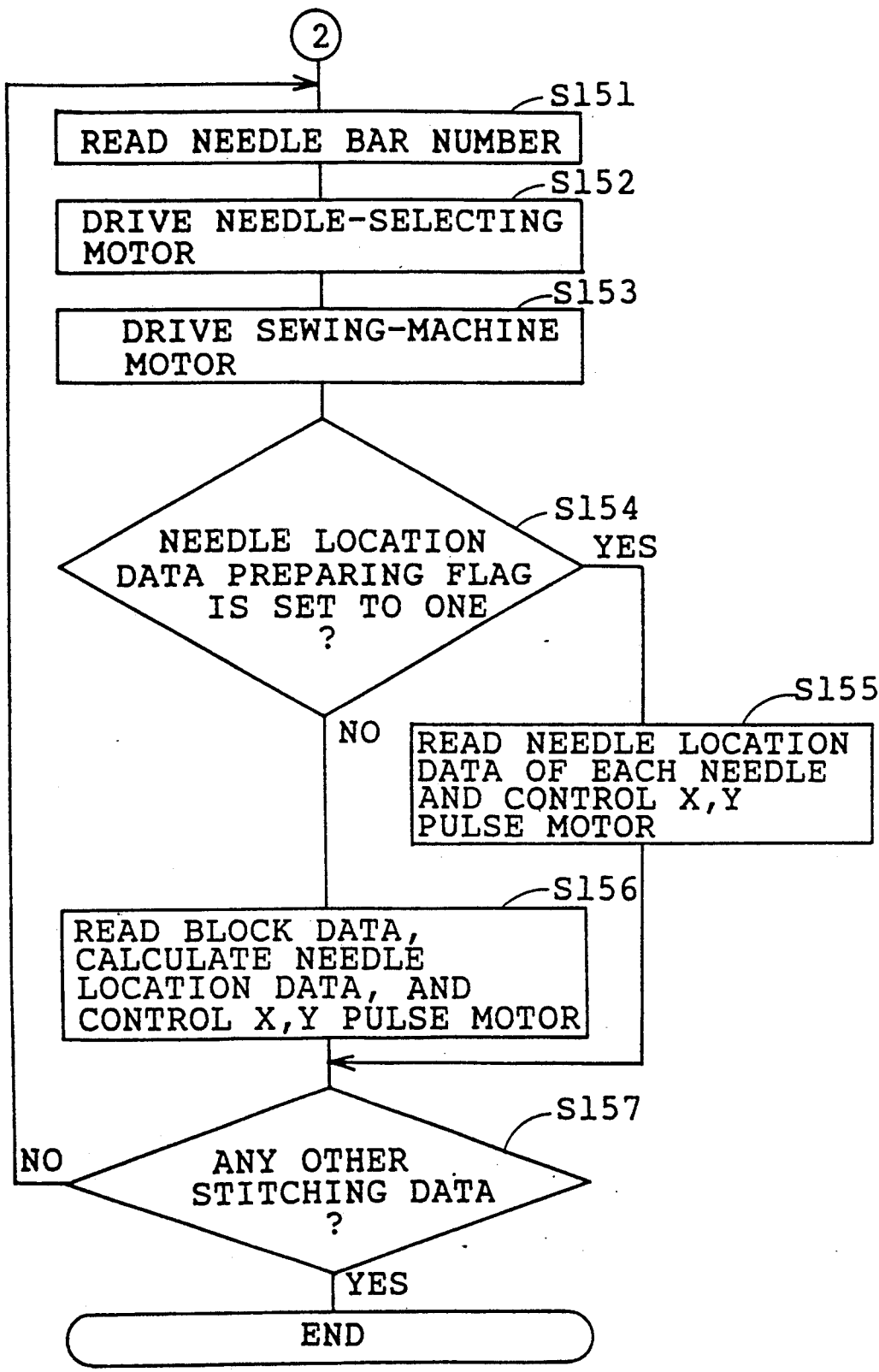

A stitching mode will now be explained, referring to FIG. 3C. It is determined at step S150 in FIG. 3B whether the stitching start key 26 is turned on. When the stitching start key 26 is turned on, the CPU 17 reads the stitching data from the operation memory 43. First, at step S151 the CPU 17 reads the needle-bar number data from the operation memory 43. At step S152, the CPU 17 drives the needleselecting motor 8 according to the needle-bar number data. After selecting the needle bar, at step S153 the CPU 17 lets out a sewing-machine motor drive signal, thereby driving the sewing-machine motor 9.

Subsequently, at step S154 the CPU 17 determines whether the needle location data preparing flag is set to one or not. When the answer at step S154 is affirmative, at step S155 the CPU 17 reads the needle location data of each needle, and drives and controls the X,Y pulse motor of the feeder 15, thereby finishing the stitching of the closed area. The sewing-machine motor 9 is then stopped and the thread is cut. It is determined at step S157 whether there is any other stitching data for the closed area. When there is more stitching data, the process returns to step S151. On the other hand, when there is no more stitching data, &he process ends.

When the needle location data preparing flag is not set to one, at step S156 the CPU 17 reads the X,Y-axis value of the vertex of each block as the block data and calculates the needle location data from the predetermined stitching density data and the block data in a known method. The CPU 17 drives and controls the X,Y pulse motor of the feeder 15 based on the needle location data of each needle, finishing the stitching of the block. When there is more stitching data, the process returns to step S151. On the other hand, when there is no more stitching data, the process ends. The stitching of the closed area is thus finished.

From the above description of a preferred embodiment of the invention, those skilled in the art will perceive improvements, changes and modifications. Such improvements, changes and modifications within the skill of the art are intended to be covered by the appended claims. For example, in the embodiment the reference direction corresponds to the length of the embroidery pattern. However, the width of the embroidery pattern can correspond to the reference direction. In this embodiment, the stitch-forming direction forms right angles to the reference direction. However, the stitchforming direction and the reference direction can intersect to form any angle.

In the embodiment, the CPU 17 searches for the expected dividing point from the MIN. point toward the MAX. point of the closed area along X-axis. However, the CPU 17 can search for the expected dividing point from the MAX. toward MIN. point.

In the embodiment, to input the closed area surrounded with the continuous line with any configuration, the operator designates points on the outline. An automatic program can be used, instead. In the automatic program, the original design drawn on a recording sheet is picked up with an image pick-up means, and outline data is extracted from the image.

What is claimed is:

1. A control data preparing apparatus for an embroidery sewing machine that stitches an embroidery pattern on a workpiece under the control of control data, comprising:
   a first memory means for storing outline data representing an outline of the embroidery pattern in a source coordinate system;
   a reference direction determining means for computing a reference direction based on the outline data, where the reference direction is in the same direction as one of a length and a width of the embroidery pattern;
   a first computing means for dividing the outline of the embroidery pattern into divided outlines defined by dividing segments based on the outline data and the reference direction and for computing divided outline data representing the outlines of the divided outlines, where the dividing segments intersect the reference direction at a predetermined angle $\theta$;
   a second computing means for computing control data from the divided outline data;
   a second memory means for storing the control data; and
   means to control the stitching of the embroidery pattern performed by the embroidery sewing machine using said control data.

2. The control data preparing apparatus of claim 1, in which the dividing segments connect two points on the outline of the embroidery pattern.

3. The control data preparing apparatus of claim 2, in which the first computing means further comprises:
   converting means for converting the outline data from the source coordinate system into an X-Y coordinate system such that the reference direction corresponds to the X-axis, where Uxi represents the X-component of a point Ui of the outline data;
   means for determining the points having maximum and minimum X-components;
   means for separating the outline of the embroidery into upper and lower segments, relative to the X-axis, where the ends of the upper and lower segments are the maximum and minimum points;
   dividing point determination means for determining where dividing points are contained on the upper and lower segments, where a point Ui is a dividing point if Uxi>Uxi−1, Uxi>Uxi+1, and Ui+1 is below, relative to the X-axis, the line defined by Ui and Ui−1 or if Uxi<Uxi−1, Uxi<Uxi+1, and Ui+1 is above, relative to the X-axis, the line defined by Ui and Ui−1; and
   first dividing means for dividing the outline of the embroidery pattern into divided outlines at each dividing point, where each divided outline is defined by one of said dividing segments and the outline of the embroidery pattern.

4. The control data preparing apparatus of claim 3, in which the converting means converts the outline data by rotating the outline data the predetermined angle $\theta$ so that the reference direction corresponds to the X-axis.

5. The control data preparing apparatus of claim 4, in which the first dividing means further comprises:

first dividing segment determining means for determining the dividing segments associated with each dividing point on the upper segment, where the dividing segments are between the dividing points and the points on the outline of the embroidery pattern above and closest to the dividing points; and
second dividing segment determining means for determining the dividing segments associated with each dividing point on the lower segment, where the dividing segments are between the dividing points and the points on the outline of the embroidery pattern below and closest to the dividing points.

6. The control data preparing apparatus of claim 5, in which the first computing means further comprises second converting means for converting the divided outline data from the X-Y coordinate system back into the source coordinate system.

7. The control data preparing apparatus of claim 6, in which the control data preparing apparatus can prepare control data comprising needle location data and control data comprising block data that is related to needle location.

8. The control data preparing apparatus of claim 6., in which the reference angle is orthogonal to a stitch-forming direction of the embroidery sewing machine.

9. A method of preparing control data for an embroidery sewing machine that stitches an embroidery pattern on a workpiece under the control of control data, comprising the steps of:
   generating outline data representing an outline of the embroidery pattern in a source coordinate system;
   computing a reference direction based on the outline data, where the reference direction is in the same direction as one of a length and a width of the embroidery pattern;
   dividing the outline of the embroidery pattern into divided outlines defined by dividing segments based on the outline data and the reference direction, where the dividing segments intersect the reference direction at a predetermined angle $\theta$;
   computing divided outline data representing the outlines of the divided outlines;
   computing control data from the divided outline data; and
   controlling the stitching of the embroidery pattern performed by the embroidery sewing machine using said control data.

10. The method of preparing control data of claim 9, in which the dividing segments connect two points on the outline of the embroidery pattern.

11. The method of preparing control data of claim 10, in which the step of dividing the outline of the embroidery pattern into divided outlines further comprises the steps of:
   converting the outline data from the source coordinate system into an X-Y coordinate system, where Uxi represents the X-component of a point Ui of the outline data;
   determining the points having maximum and minimum X-components;
   separating the outline of the embroidery into upper and lower segments, relative to the X-axis, where the ends of the upper and lower segments are the maximum and minimum points;
   determining where dividing points are contained on the upper and lower segments, where a point Ui is a dividing point or if $U_{xi} > U_{xi-1}$, $U_{xi} > U_{xi+1}$, and $U_{i+1}$ is below, relative to the X-axis, the line defined by $U_i$ and $U_{i-1}$ or if $U_{xi} < U_{xi-1}$, $U_{xi} < U_{xi+1}$, and $U_{i+1}$ is above, relative to the X axis, the line defined by $U_i$ and $U_{i-1}$; and dividing the outline of the embroidery pattern into divided outlines at each dividing point, where each divided outline is defined by one of said dividing segments and the outline of the embroidery pattern.

12. The method of preparing control data of claim 11, in which the outline data is converted into X-Y data by rotating the outline data the predetermined angle $\theta$ so that the reference direction corresponds to the Y-axis.

13. The method of preparing control data of claim 12, in which the step of dividing the outline into divided outlines at each dividing point further comprises the steps of:

determining the dividing segments associated with each dividing point on the upper segment, where the dividing segments are between the dividing points and the points on the dividing lines and the outline of the embroidery pattern above and closest to the dividing points; and determining the dividing segments associated with each dividing point on the lower segment, where the dividing segments are between the dividing points and the points on the dividing lines and the outline of the embroidery pattern below and closest to the dividing points.

14. The control data preparing apparatus of claim 13, in which the step of dividing the outline of the embroidery pattern into divided outlines further comprises the step of converting the divided outline data from the X-Y coordinate system back into the source coordinate system.

15. The method of preparing control data of claim 14, in which the control data preparing apparatus can prepare control data comprising needle location data and control data comprising block data that is related to needle location.

16. The method of preparing control data of claim 14, in which the reference angle is orthogonal to a stitch-forming direction of the embroidery sewing machine.

* * * * *